United States Patent
Zeng et al.

(10) Patent No.: US 10,803,284 B2
(45) Date of Patent: Oct. 13, 2020

(54) DISPLAY PANEL WITH FINGERPRINT RECOGNITION FUNCTION AND DISPLAY DEVICE

(71) Applicant: Shanghai Tianma Micro-Electronics Co., Ltd., Shanghai (CN)

(72) Inventors: Yang Zeng, Shanghai (CN); Lihua Wang, Shanghai (CN); Haochi Yu, Shanghai (CN); Qing Zhang, Shanghai (CN); Lingxiao Du, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 106 days.

(21) Appl. No.: 16/130,678

(22) Filed: Sep. 13, 2018

(65) Prior Publication Data

US 2019/0303638 A1     Oct. 3, 2019

(30) Foreign Application Priority Data

Mar. 28, 2018    (CN) .......................... 2018 1 0264474

(51) Int. Cl.
| | |
|---|---|
| *G06F 1/16* | (2006.01) |
| *G06K 9/00* | (2006.01) |
| *G06F 3/042* | (2006.01) |
| *G06F 3/041* | (2006.01) |
| *G02F 1/1333* | (2006.01) |
| *G06F 3/0488* | (2013.01) |
| *G06F 21/32* | (2013.01) |

(52) U.S. Cl.
CPC ....... *G06K 9/0004* (2013.01); *G02F 1/13338* (2013.01); *G06F 3/0412* (2013.01); *G06F 3/0421* (2013.01); *G06F 3/0488* (2013.01); *G06F 21/32* (2013.01)

(58) Field of Classification Search
CPC ............. G06K 9/00013; G06K 9/0004; G06K 9/0008; G02F 1/13338; G06F 3/0412; G06F 3/0421
See application file for complete search history.

(56) References Cited

U.S. PATENT DOCUMENTS

| | | | |
|---|---|---|---|
| 10,147,757 B2 * | 12/2018 | Lee ...................... | G06K 9/0004 |
| 10,510,814 B2 * | 12/2019 | Sun ..................... | H01L 27/3248 |
| 2015/0156866 A1 * | 6/2015 | Shim .................... | H05K 1/0274 |
| | | | 361/751 |

(Continued)

*Primary Examiner* — Xuemei Zheng
(74) *Attorney, Agent, or Firm* — Miller, Matthias & Hull LLP (57) ABSTRACT

Provided are a display panel and a display device. The display panel includes a display assembly, the display assembly includes an array substrate and a plurality of pixel units disposed on the array substrate; and a fingerprint recognition assembly, the fingerprint recognition assembly disposed on one side of the array substrate facing away from the plurality of pixel units, the fingerprint recognition assembly includes a first substrate and at least one fingerprint recognition unit disposed on the first substrate, the fingerprint recognition unit includes a photosensitive region. The array substrate includes a plurality of transparent regions and a plurality of non-transparent regions. Along a direction perpendicular to the array substrate, at least a portion of the plurality of transparent regions in the array substrate is covered by a photosensitive region of any one of the at least one fingerprint recognition units.

16 Claims, 8 Drawing Sheets

(56) References Cited

U.S. PATENT DOCUMENTS

2017/0161543 A1\* 6/2017 Smith .................. G06K 9/0008
2018/0211085 A1\* 7/2018 Liu ..................... G02F 1/13306
2019/0237521 A1\* 8/2019 Ju ........................ H01L 27/323

\* cited by examiner

DISPLAY PANEL WITH FINGERPRINT RECOGNITION FUNCTION AND DISPLAY DEVICE

CROSS-REFERENCE TO RELATED APPLICATIONS

This application claims priority to a Chinese patent application No. 201810264474. 5 filed on Mar. 28, 2018, the disclosure of which is incorporated herein by reference in its entirety.

TECHNICAL FIELD

The present disclosure relates to display technologies, and in particular relates to a display panel and a display device.

BACKGROUND

Fingerprints are inherent for every person. With the development of technology, there are many display devices with a function of fingerprint recognition appeared in the market, such as mobile phones, tablet computers, and smart wearable devices. Before operating the display device with the function of fingerprint recognition, a user only needs to touch the display device by using a finger to perform an authority verification, which simplifies an authority verification process.

A display panel with a function of fingerprint recognition commonly provides a fingerprint recognition assembly to be disposed under a display assembly, and light emitted from a light source is reflected by the touch object and passes through the display assembly, and is received by the fingerprint recognition assembly under the display assembly. Therefore, the function of fingerprint recognition is achieved by the display panel. An array substrate of the display assembly includes non-transparent regions formed by opaque film layers (e.g. metal layers), and the fingerprint recognition assembly includes a plurality of fingerprint recognition units. When photosensitive regions in some of the fingerprint recognition units are configured to be fully mapped to non-transparent regions of the array substrate, the some of the fingerprint recognition units fail to sense light, resulting in dark spots in a fingerprint recognition image finally formed, so that the accuracy of fingerprint recognition of the display panel is affected.

SUMMARY

The present disclosure provides a display panel and a display device, along a direction perpendicular to an array substrate, by providing at least a portion of transparent regions to be covered by a photosensitive region of fingerprint recognition unit, a case that the photosensitive region of the fingerprint recognition unit is wholly disposed in non-transparent regions of the array substrate is avoided. Therefore, a problem that dark spots are resulted in a fingerprint recognition image finally formed is avoided.

In a first aspect, the present disclosure provides a display panel, including: a display assembly, where the display assembly includes an array substrate and a plurality of pixel units disposed on the array substrate; a fingerprint recognition assembly, where the fingerprint recognition assembly is disposed on one side of the array substrate facing away from the plurality of pixel units, the fingerprint recognition assembly includes a first substrate and at least one fingerprint recognition unit disposed on the first substrate, the at least one fingerprint recognition unit includes a photosensitive region, and the at least one fingerprint recognition unit is configured to perform a fingerprint recognition based on light reflected to the photosensitive region via a touch object; and the array substrate includes a plurality of transparent regions and a plurality of non-transparent regions, along a direction perpendicular to the array substrate, at least a portion of the plurality of transparent regions in the array substrate is covered by the photosensitive region of any one of the at least one fingerprint recognition unit.

In a second aspect, the present disclosure further provides a display device including the display panel described in the first aspect.

The present disclosure provides a display panel and a display device, by providing the fingerprint recognition unit to be disposed on one side of the array substrate facing away from the pixel units, the fingerprint recognition unit is configured to perform a fingerprint recognition based on light reflected to the fingerprint recognition unit via a touch object, that is, the light reflected to the fingerprint recognition unit should pass through the array substrate; and along a direction perpendicular to an array substrate, by providing at least a portion of transparent regions in the array substrate to be covered by a photosensitive region of any one of fingerprint recognition units, a case that the photosensitive region of the fingerprint recognition unit is wholly disposed in non-transparent regions of the array substrate is avoided. Therefore, a problem that dark spots are resulted in a fingerprint recognition image finally formed is avoided.

BRIEF DESCRIPTION OF DRAWINGS

By referring to a detailed description of non-restrictive embodiments according to below drawings, other features, purposes and advantages of the present disclosure become more apparent.

DETAILED DESCRIPTION

The present disclosure is further described below in combination with the drawings and embodiments. It should be understood that the specific embodiments described herein are merely used to explain the present disclosure rather than limiting the present disclosure. In addition, it should be stated that in order to facilitate the description, merely a part of structures related to the present disclosure rather than the whole structure are illustrated in the drawings. Throughout the description, the same or similar numerals denote the same or similar structures, elements and processes. It should also be noted that, embodiments and features of the embodiments may be combined under no conflicts.

The present disclosure provides a display panel, and the display panel includes a display assembly and a fingerprint recognition assembly. The display assembly includes an array substrate and a plurality of pixel units disposed on the array substrate. The fingerprint recognition assembly is disposed on one side of the array substrate facing away from the plurality of pixel units, the fingerprint recognition assembly includes a first substrate and at least one fingerprint recognition unit disposed on the first substrate. The fingerprint recognition unit is configured to perform a fingerprint recognition based on light reflected to the fingerprint recognition unit via a touch object. The array substrate includes a plurality of transparent regions and a plurality of non-transparent regions. Along a direction perpendicular to the array substrate, at least a portion of the plurality of transparent regions in the array substrate is covered by a photosensitive region of any one of the at least one fingerprint recognition unit.

Persons' dermatoglyphs including a fingerprint are different in pattern, breakpoints and intersection points, showing uniqueness and remaining unchanged throughout one's life. In view of the above contents, we can identify a person with his fingerprint to verify his real identity by comparing his fingerprint with pre-stored fingerprint data, and that is fingerprint recognition technology. With the development of electronic integrated manufacturing technology, an optical fingerprint recognition technology in the fingerprint recognition technology has begun to enter in our daily life and has become a technology which is researched in-depth, most widely applied and developed to a maturity stage, in a biological detection. The working principle of the optical fingerprint recognition technology is light emitted from a light source of the display panel irradiates to a finger, reflection light formed by the light reflecting via the finger is transmitted to a fingerprint recognition sensor, and the fingerprint recognition sensor is configured to collect light signals entering into the fingerprint recognition sensor. Due to an existence of a specific pattern on the fingerprint, the strengths of reflection light formed at ridges and valleys are different. As a result, the light signals collected by each fingerprint recognition sensor are different, and thus a function of the fingerprint recognition is achieved. Therefore, a real identification of a user may be determined based on the above.

A display panel with a function of fingerprint recognition commonly provides a fingerprint recognition assembly disposed under a display assembly, and light emitted from a light source is reflected by the touch object and passes through the display assembly, and is received by the fingerprint recognition assembly under the display assembly. Therefore, the function of fingerprint recognition is achieved by the display panel. An array substrate of the display assembly includes non-transparent regions formed by opaque film layers (e.g. metal layers), and the fingerprint recognition assembly includes a plurality of fingerprint recognition units. When photosensitive regions in some of the fingerprint recognition units are configured to be fully mapped to non-transparent regions of the array substrate, some of the fingerprint recognition units fail to sense light, resulting in dark spots in a fingerprint recognition image finally formed, so that the accuracy of fingerprint recognition of the display panel is affected.

The present disclosure provides the fingerprint recognition unit to be disposed on one side of the array substrate facing away from the pixel units, and the fingerprint recognition unit is configured to perform a fingerprint recognition based on light reflected to the fingerprint recognition unit via a touch object. The array substrate includes a plurality of transparent regions and a plurality of non-transparent regions, that is, the light reflected to the fingerprint recognition unit should pass through the non-transparent regions of the array substrate to arrive at the fingerprint recognition unit; and along a direction perpendicular to an array substrate. By providing at least a portion of transparent regions in the array substrate to be covered by a photosensitive region of any one of the at least fingerprint recognition unit, a case that the photosensitive region of one of fingerprint recognition units is wholly disposed in non-transparent regions of the array substrate is avoided. Therefore, a problem that dark spots are resulted in a fingerprint recognition image finally formed is avoided.

The above contents are principles of the present disclosure, a detailed description on the technical solutions of the present disclosure is clearly and fully given in combination with the drawings of the present disclosure. Based on the embodiments of the present disclosure, other embodiments obtained by those skilled in the art without creative works are fallen into a protection scope of the present disclosure.

Figure 1:
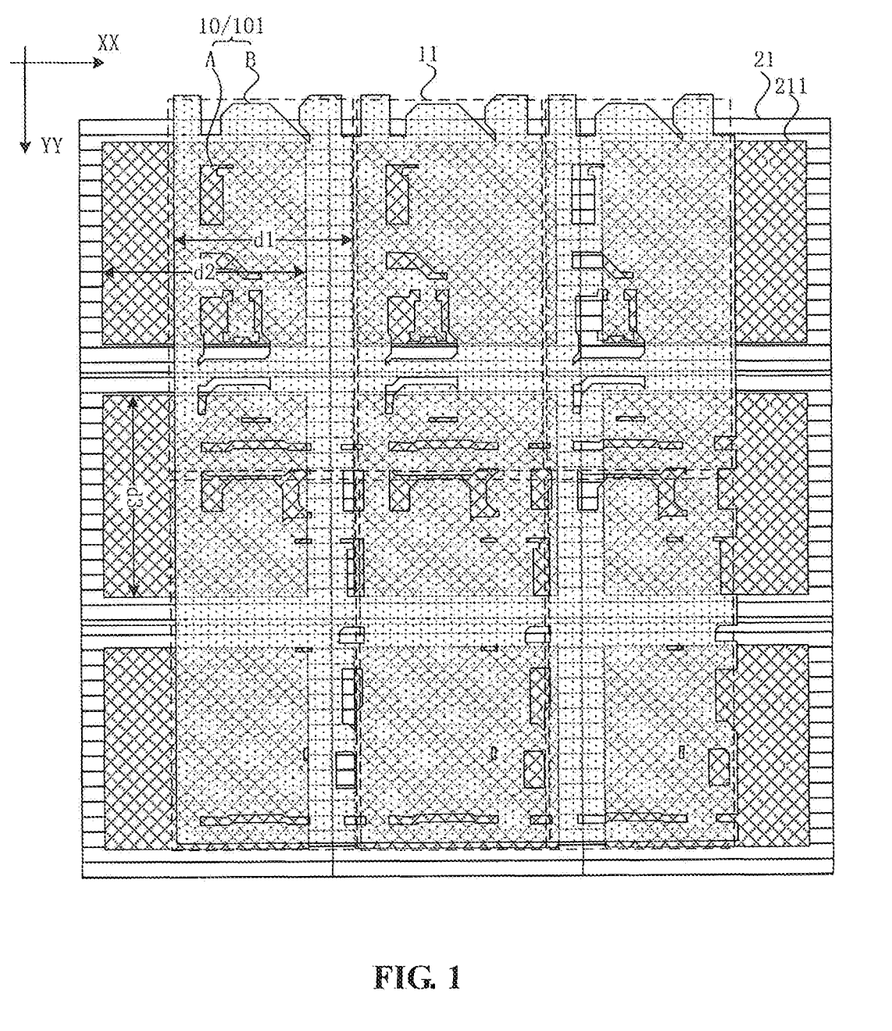
FIG. 1 is a top view of a display panel according to an embodiment of the present disclosure.
Figure 2:
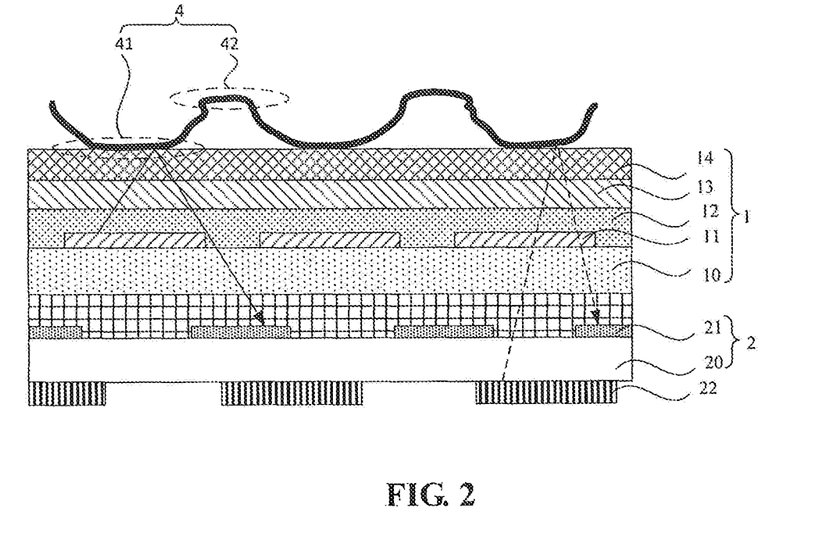
FIG. 2 is a cross-section view of a display panel according to an embodiment of the present disclosure.

FIG. 1 is a top view of a display panel according to an embodiment of the present disclosure, and FIG. 2 is a cross-section view of a display panel according to an embodiment of the present disclosure. In combination with FIG. 1 and FIG. 2, the display panel includes a display assembly 1 and a fingerprint recognition assembly 2. The display assembly 1 includes an array substrate 10 and a plurality of pixel units 11 disposed on the array substrate 10. The fingerprint recognition assembly 2 is disposed on one side of the array substrate 10 facing away from the plurality of pixel units 11, the fingerprint recognition assembly 2 includes a first substrate 20 and at least one fingerprint recognition unit 21 disposed on the first substrate 20, and the fingerprint recognition unit 21 is configured to perform a fingerprint recognition based on light reflected to the fingerprint recognition unit 21 via a touch object 4.

The array substrate 10 includes a plurality of transparent regions A and a plurality of non-transparent regions B. FIG. 1 exemplarily shows projection patterns 101 of all non-transparent regions B in a partial area of the display panel on the array substrate 10, the display assembly 1 includes a plurality of pixel units 11, the projection patterns 101 corresponding to the pixel units 11 may be divided into a plurality of non-transparent regions B. Besides the non-transparent regions B, the array substrate 10 further includes a plurality of transparent regions A, and hollow regions in the projection pattern 101 of FIG. 1 are transparent regions A. It should be noted that, FIG. 1 exemplarily shows the non-transparent regions B and the transparent regions A of the array substrate 10, no limitations are made to the shape of the non-transparent regions B and the transparent regions A of the array substrate 10 in the present disclosure and the shape of the non-transparent regions B and the transparent regions A of the array substrate 10 may be configured according to the practical requirements of products.

As shown in FIG. 1, along a direction perpendicular to an array substrate 10, by providing at least a portion of transparent regions A in the array substrate 10 to be covered by a photosensitive region 211 of any one of the at least fingerprint recognition unit 21, the at least a portion of transparent regions A is covered by the photosensitive regions 211 of all the fingerprint recognition units 21 along a direction perpendicular to an array substrate 10. FIG. 1 merely exemplarily shows a partial area of the display panel, from FIG. 1, in the direction perpendicular to the array substrate 10, the at least a portion of transparent regions A is covered by the photosensitive regions 211 of all the fingerprint recognition units 21 in the partial area.

The touch object 4 is commonly a finger, and a fingerprint is formed by a series of ridges 41 and valleys 42 on a skin surface of a fingertip. Since distances from the ridges 41 and the valleys 42 to the fingerprint recognition unit 21 are different, the strengths of light reflected from the ridges 41 and the valleys 42 are different, so that the magnitudes of current signals converted from the reflection light formed at the ridges 41 and the valleys 42 are different, and thus the fingerprint recognition may be performed based on the magnitudes of the current signals. It should be noted that, the touch object 4 may be a palm and so on, and a palmprint may also be utilized to achieve functions of detection and recognition.

Figure 3:
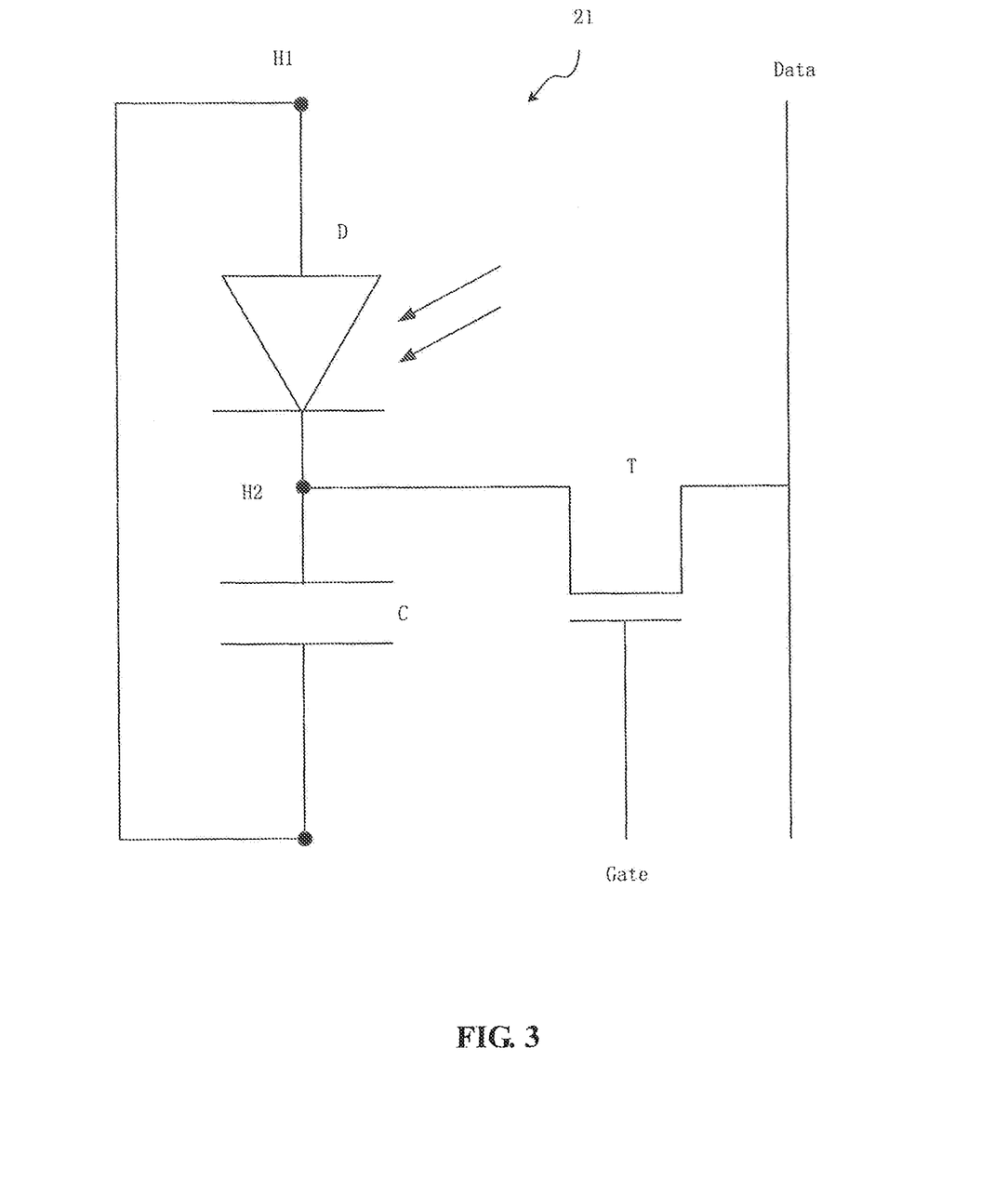
FIG. 3 is a structural diagram showing a circuit of a fingerprint recognition unit according to an embodiment of the present disclosure.
Figure 4:
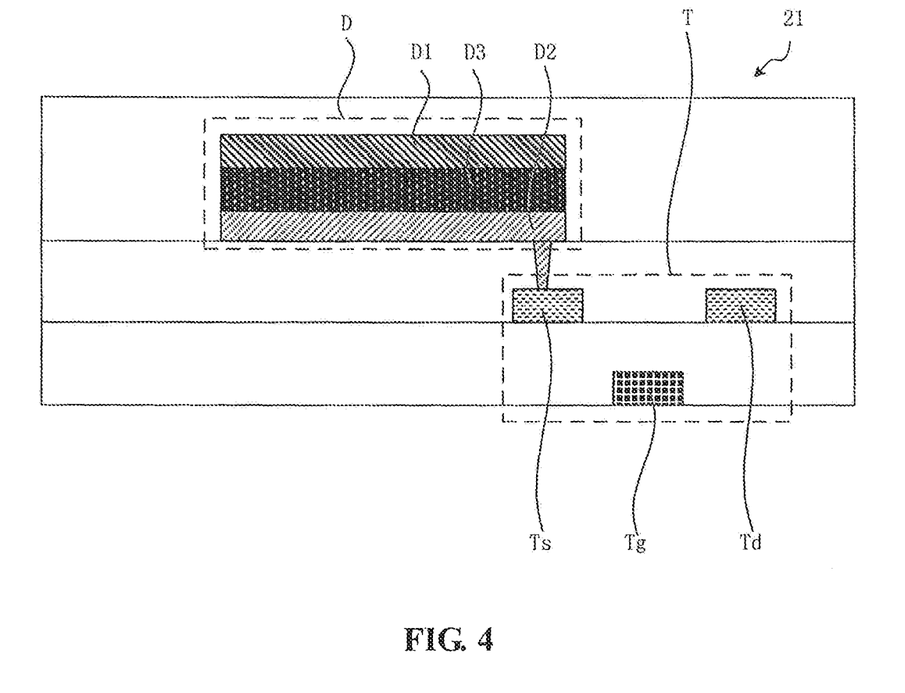
FIG. 4 is a structural diagram showing film layers of a fingerprint recognition unit according to an embodiment of the present disclosure.

FIG. 3 is a structural diagram showing a circuit of a fingerprint recognition unit according to an embodiment of the present disclosure, and FIG. 4 is a structural diagram showing film layers of a fingerprint recognition unit according to an embodiment of the present disclosure. In combination of FIG. 3 and FIG. 4, the fingerprint recognition unit 21 includes a photodiode D, a storage capacitor C and a thin-film transistor T. An anode D1 of the photodiode D is electrically connected to a first electrode of the storage capacitor C, and a cathode D2 of the photodiode D is electrically connected to a second electrode of the storage capacitor C and a source electrode Ts of the thin-film transistor T. A gate electrode Tg of the thin-film transistor T is electrically connected to a switching control line Gate, and the a drain electrode Td is electrically connected to a data signal line Data. The photodiode D is configured to convert the light reflected by the touch object into a current signal. In one embodiment, the photodiode D further includes a PIN junction D3 between the anode D1 and the cathode D2. Among them, the cathode D2 is formed by a non-transparent metal, and a boundary of the PIN junction D3 does not exceed a boundary of the cathode D2. The anode D1 of the photodiode D is disposed on one side of the PIN junction D3 facing away from the thin-film transistor T. The PIN junction D3 has a photosensitive feature and a feature of unilateral conduction. When there is no light to irradiate the photodiode D, the PIN junction D3 has an extremely small saturated reverse leakage current, that is, a dark current. At this moment, the photodiode D is cut off. When the photodiode D is irradiated by the light, the saturated reverse leakage current of the PN junction D3 is greatly increased to form a photocurrent, and the photocurrent varies with the strength of incident light.

A detailed description for principles of the fingerprint recognition performed by the display panel is given in combination with FIG. 3 and FIG. 4. In a fingerprint recognition stage, a low-voltage signal (e.g. a constant voltage signal with a magnitude of −5V) is inputted to a node H1, a high-voltage signal (e.g. a constant voltage signal with a magnitude of 1.5V) is inputted to the data line Data. The whole fingerprint recognition stage includes a preparation stage, a fingerprint signal collecting stage and a fingerprint detection stage. In the preparation stage, a driver chip (not shown in FIG. 3 and FIG. 4) electrically connected to the fingerprint recognition unit 21 controls the thin-film transistor T of the fingerprint recognition unit 21 to be turned on via the switching control line Gate. Then, the storage capacitor C is charged until a charging of the storage capacitor C is finished. In the fingerprint recognition stage, the thin-film transistor T of the fingerprint recognition unit 21 is controlled to be turned off via the switching control line Gate. When a user presses the display panel by using a finger, reflection light reflected by the finger enters into the fingerprint recognition unit 21 and is received by the photodiode D of the fingerprint recognition unit 21 to form a photocurrent. The direction of the photocurrent is directed from the node H2 to the node H1, so that the potential of the node H2 changes. In a fingerprint signal detection stage, a potential variation of the node H2 may be directly measured so as to determine the magnitude of the photocurrent, so that a function of fingerprint recognition of the display panel is achieved. Exemplarily, in the fingerprint signal detection stage, the switching control line Gate may be utilized to control the thin-film transistor T of the fingerprint recognition unit 21 to be turned on. At this moment, potential difference between two electrodes of the storage capacitor C occurs, and the storage capacitor C is in a charging state. By measuring the charged charge amount of the storage capacitor C, the magnitude of the photocurrent is determined and the function of fingerprint recognition of the display panel is achieved.

In one embodiment, in combination with FIGS. 1 to 4, the fingerprint recognition unit 21 includes a photodiode D, the photodiode D is a photosensitive module of the fingerprint recognition unit 21, and a region in which the photodiode D disposed is configured as a photosensitive region 211 of the fingerprint recognition unit 21. The non-transparent regions B of the array substrate 10 are configured to arrange in multiple rows along the first extending direction XX, the non-transparent regions B are configured to arrange in multiple columns along the second extending direction YY, the first extending direction XX and the second extending direction YY are perpendicular to each other.

Along the first extending direction XX, a largest distance between two points in the non-transparent region B is configured to be smaller than that between two points in the photosensitive region 211 of the fingerprint recognition unit 21. Along the second extending direction YY, a largest distance between two points in the non-transparent region B is configured to be smaller than that between two points in the photosensitive region 211 of the fingerprint recognition unit 21. Along the first extending direction XX, a largest distance between two points in the non-transparent region B is merely configured to be smaller than that between two points in the photosensitive region 211 of the fingerprint recognition unit 21, or, along the second extending direction YY, a largest distance between two points in the non-transparent region B is merely configured to be smaller than that between two points in the photosensitive region 211 of the fingerprint recognition unit 21.

FIG. 1 exemplarily shows a configuration that a largest distance d1 between two points in the non-transparent region B is smaller than a largest distance d2 between two points in the photosensitive region 211 of the fingerprint recognition unit 21. By making limitations to relations between a largest distance between two points in the non-transparent region B along the first extending direction XX and a largest distance between two points in the photosensitive region 211 of the fingerprint recognition unit 21 along the first extending direction XX, at least a portion of transparent regions A in the array substrate 10 to be covered by the photosensitive region 211 of any one of the at least fingerprint recognition unit 21 is ensured and a case that the photosensitive region 211 of the fingerprint recognition unit 21 is wholly disposed in the non-transparent regions B of the array substrate 10 is avoided. Therefore, a problem that dark spots are resulted in a fingerprint recognition image finally formed is avoided.

Exemplarily, as shown in FIG. 1, the photosensitive region 211 of the fingerprint recognition unit 21 may be configured to have a rectangular shape, a boundary of the photosensitive region 211 of the fingerprint recognition unit 21 is disposed parallel to the first extending direction XX, and the upper and lower boundaries of the photosensitive region 211 are disposed parallel to the first extending direction XX as shown in FIG. 1. Along the first extending direction XX, a largest distance between two points in the non-transparent region B is configured to be smaller than a side length of the photosensitive region 211 of the fingerprint recognition unit 21; and along the second extending direction YY, a large distance between two points in the non-transparent region B is configured to be smaller than a side length of the photosensitive region 211 of the fingerprint recognition unit 21. Along the first extending direction XX, a largest distance between two points in the non-transparent region B is merely configured to be smaller than that of a side length of the photosensitive region 211 of the fingerprint recognition unit 21, or, along the second extending direction YY, a largest distance between two points in the non-transparent region B is merely configured to be smaller than a side length of the photosensitive region 211 of the fingerprint recognition unit 21.

FIG. 1 exemplarily shows a configuration that a largest distance d between two points in the non-transparent region B is smaller than a side length d2 of the photosensitive region 211 of the fingerprint recognition unit 21, so that at least a portion of the transparent region A in the array substrate 10 is ensured to be covered by any one of the at least one fingerprint recognition unit 21, thereby avoiding a case that the photosensitive region 211 of the fingerprint recognition unit 21 is wholly disposed in the non-transparent regions B of the array substrate 10. Therefore, a problem that dark spots are resulted in a fingerprint recognition image finally formed is avoided.

In one embodiment, as shown in FIG. 1, the photosensitive region 211 of the fingerprint recognition unit 21 has a rectangular shape, the side length of a long side of the photosensitive region 211 of the fingerprint recognition unit 21 is configured to be not larger than 100 μm. That is, the larger value of d2 and d3 of the photosensitive region 211 of the fingerprint recognition unit 21 is configured to be not larger than 100 μm. If the size of the photosensitive region 211 of the fingerprint recognition unit 21 is excessively large, the number of fingerprint recognition units 21 in the display panel is reduced for a display panel of the same area size, which is disadvantageous in improving the accuracy of the fingerprint recognition of the display panel. Exemplarily, the photosensitive region 211 of the fingerprint recognition unit 21 may have a square shape. That is, d2 is configured to be same with d3.

Figure 5:
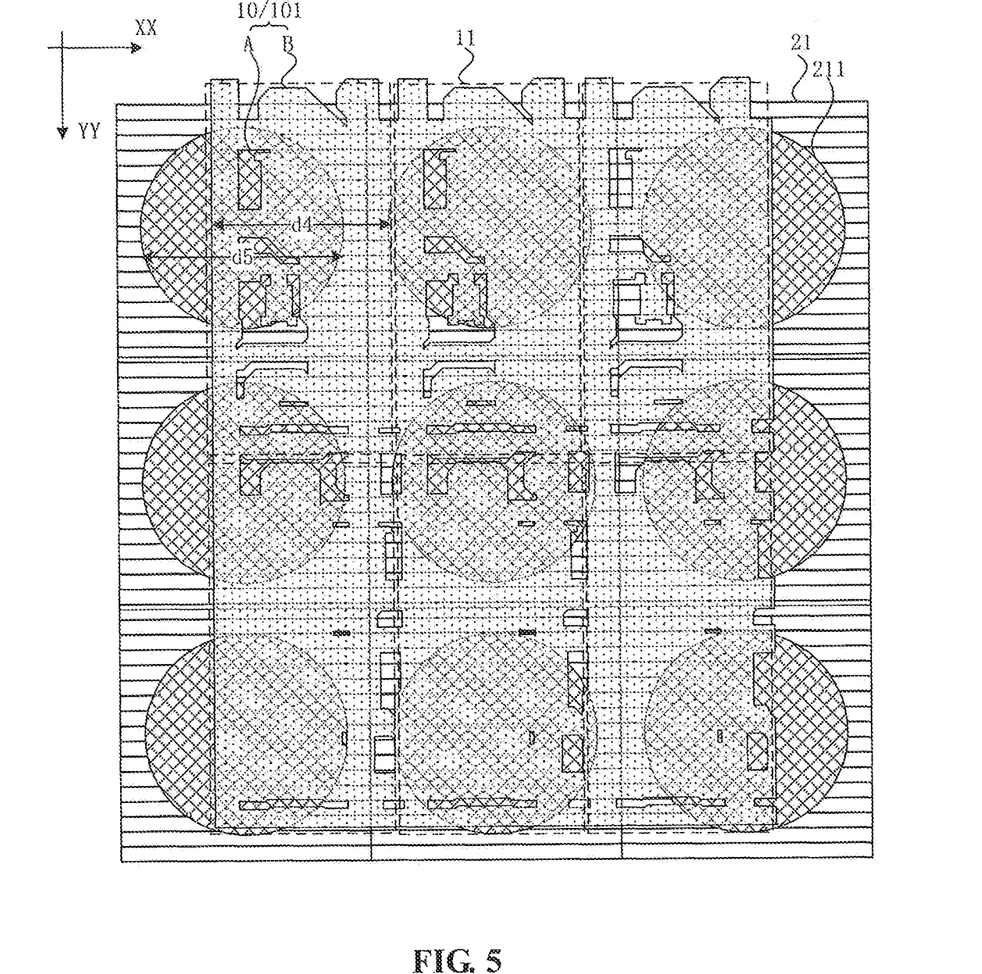
FIG. 5 is a top view of another display panel according to an embodiment of the present disclosure.

FIG. 5 is a top view of another display panel according to an embodiment of the present disclosure. As shown in FIG. 5, the photosensitive region 211 of the fingerprint recognition unit 21 may also be exemplarily configured to have a circular shape, In such way, along the first extending direction XX, a largest distance between two points in the non-transparent region B is configured to be smaller than a diameter of the photosensitive region 211 of the fingerprint recognition unit 21, and along the second extending direction YY, a largest distance between two points in the non-transparent region B is configured to be smaller than a diameter of the photosensitive region 211 of the fingerprint recognition unit 21. Along the first extending direction XX, a largest distance between two points in the non-transparent region B is merely configured to be smaller than the diameter of the photosensitive region 211 of the fingerprint recognition unit 21, or, along the second extending direction YY, a largest distance between two points in the non-transparent region B is merely configured to be smaller than a diameter of the photosensitive region 211 of the fingerprint recognition unit 21.

FIG. 5 exemplarily shows a configuration that a largest distance d4 between two points in the non-transparent region B is smaller than a diameter d5 of the photosensitive region 211 of the fingerprint recognition unit 21, so that at least a portion of the transparent region A in the array substrate 10 is also ensured to be covered by any one of the at least one fingerprint recognition unit 21, thereby avoiding a case that the photosensitive region 211 of the fingerprint recognition unit 21 is wholly disposed in the non-transparent regions B of the array substrate 10. Therefore, a problem that dark spots are resulted in a fingerprint recognition image finally formed is avoided.

In one embodiment, as shown in FIG. 5, the photosensitive region 211 of the fingerprint recognition unit 21 has a circular shape, the diameter of the photosensitive region 211 of the fingerprint recognition unit 21 may be configured to be not larger than 100 μm. Similarly, if the size of the photosensitive region 211 of the fingerprint recognition unit 21 is excessively large, the number of fingerprint recognition units 21 in the display panel is reduced for a display panel of the same area size, which is disadvantageous in improving the accuracy of the fingerprint recognition of the display panel. It should be noted that FIG. 4 and FIG. 5 merely show a configuration that the fingerprint recognition units 21 are arranged in a matrix. The fingerprint recognition units 21 may also be arranged in other types, and no limitations are made thereto.

In one embodiment, along a direction perpendicular to the array substrate 10, in the photosensitive region 211 of all the fingerprint recognition units 21, a ratio between the maximum value and the minimum value of ratios of the areas of the transparent regions A covered by the photosensitive region 211 to the area of the photosensitive region 211 is configured to be less than 10. The ratios of the areas of the transparent regions A covered by the photosensitive region 211 of the fingerprint recognition unit 21 to the area of the photosensitive region 211 of the fingerprint recognition unit 21 are defined as transparent region proportions of the fingerprint recognition unit 21. That is, a ratio between the maximum value and the minimum value of the transparent region proportions of the fingerprint recognition unit 21 is less than 10. Therefore, a problem that a poor evenness in the photosensitivity of the fingerprint recognition unit 21 is effectively avoided, which is caused by an excessively large sensitivity difference between each fingerprint identification unit 21 in the display panel due to a large difference in the transparent region proportions of the fingerprint recognition unit 21.

Exemplarily, the fingerprint recognition units 21 may also be arranged to form a set of fingerprint recognition units 21 in order according to the proportion of the transparent region, a ratio between the maximum value and the minimum value of the transparent region proportions of any 80% adjacent fingerprint recognition units 21 in the set of fingerprint recognition units 21 is configured to be less than 10. For example, ten fingerprint recognition units 21 are configured in the display panel, and the ten fingerprint recognition units 21 are arranged successively from big to small according to the transparent region proportions to form a set of fingerprint recognition units 21. A ratio between the transparent region proportion of the second fingerprint recognition unit 21 and the transparent region proportion of the ninth fingerprint recognition unit 21 in the set of fingerprint recognition units 21 formed by the ten fingerprint recognition units 21 may be configured to be less than 10. Therefore, a problem that a poor evenness in the photosensitivity of the fingerprint recognition unit 21 is effectively avoided, which is caused by an excessively large sensitivity difference between each fingerprint identification unit 21 in the display panel due to a large difference in the transparent region proportions of the fingerprint recognition unit 21.

Figure 6:
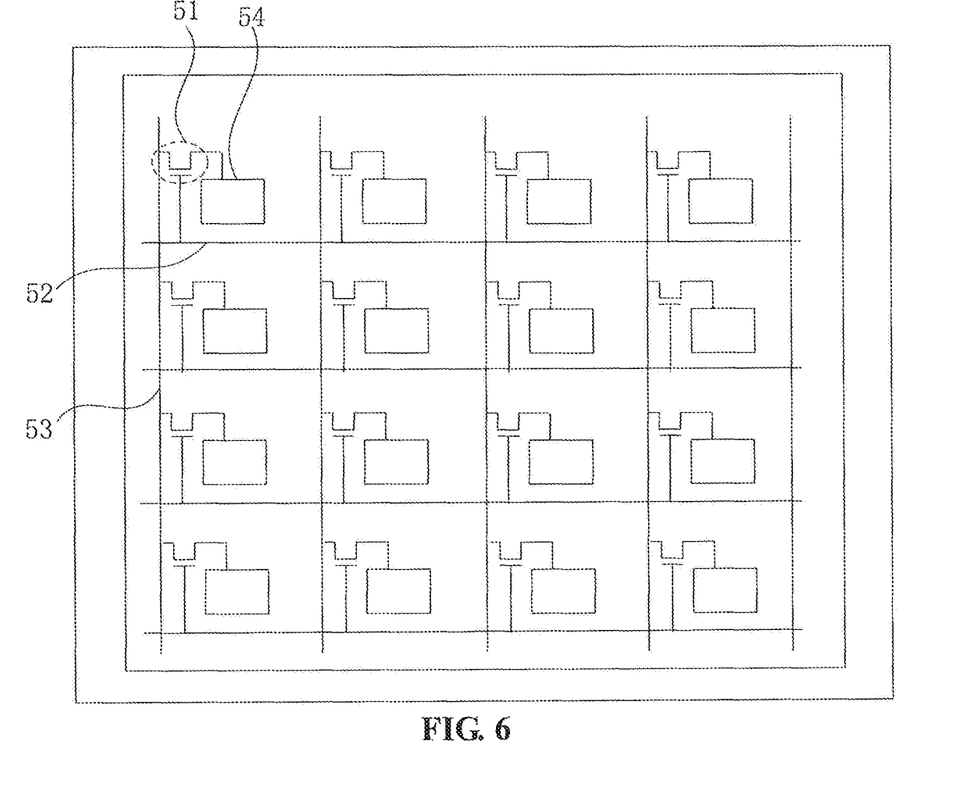
FIG. 6 is a top view of another display panel according to an embodiment of the present disclosure.

FIG. 6 is a top view of another display panel according to an embodiment of the present disclosure. As shown in FIG. 6, a display panel is, for example, an organic light-emitting display panel. The display panel includes a plurality of pixel circuits 51, a plurality of scanning signal lines 52, a plurality of data signal lines 53 and a plurality of organic light-emitting elements 54. A pixel circuit 51 and an organic light emitting element 54 may be disposed in a space formed by the intersection of the scanning signal lines 52 and the data signal lines 53. A pixel circuit 51 may communicate with the data signal line 52 and organic light-emitting element 54 electrically connected to the pixel circuit 51 under the action of a scanning signal inputted by the scanning signal line 52 electrically connected to the pixel circuit 51. A data line 53 transmits a data signal to the respective organic light-emitting element 54, and thus a display function of the display panel is achieved based on the above.

Figure 7:
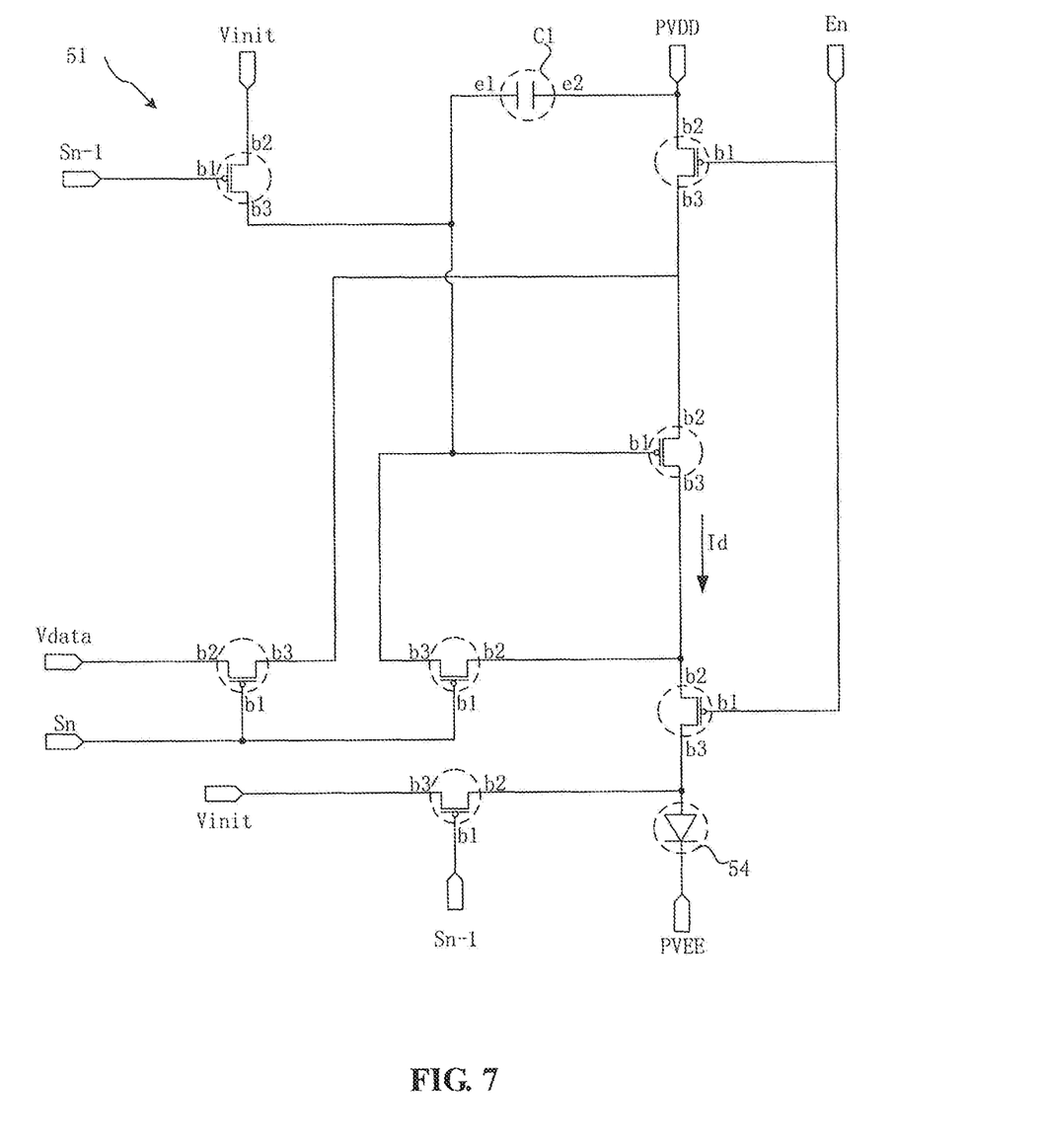
FIG. 7 is a diagram showing a circuit structure of a pixel circuit according to an embodiment of the present disclosure.

FIG. 7 is a diagram showing a circuit structure of a pixel driving circuit according to an embodiment of the present disclosure. A pixel driving circuit in FIG. 7 is exemplarily configured as a 7T1C structure. That is, the pixel driving circuit includes seven thin-film transistors and one capacitor, and no limitations are made to the number of transistors and capacitors in the pixel driving circuit of the display panel.

In one embodiment, the array substrate 10 includes a plurality of capacitors, a power signal line, a data signal line, a scanning signal line, a reset signal line and a light-emitting signal line, and the pixel unit includes a reflective electrode. In combination with FIG. 6 and FIG. 7, a power signal line is electrically connected to a terminal PVDD, the data signal line 53 is electrically connected to a terminal Vdata of a pixel circuit 51 corresponding to the data signal line 53, the scanning signal line 52 is electrically connected to a terminal Sn of a pixel circuit 51 corresponding to the scanning signal line 52, and a terminal Sn−1 of the pixel circuit 51 is electrically connected to a scanning signal line 52 corresponding to a pixel circuit 51 in a previous row. The reset signal line is electrically connected to a terminal Vinit, and the light-emitting signal line is electrically connected to a terminal En. In combination with FIG. 1, FIG. 5, FIG. 6 and FIG. 7, an area in which the plurality of capacitors, the power signal line, the data signal line, the scanning signal line, the reset signal line, the light-emitting signal line and the reflective electrode are located is configured as a non-transparent region B. Exemplarily, the display panel may be an organic light-emitting display panel, and the reflective electrode is one of non-transparent electrodes in the anode or the cathode. The display panel may also be a liquid crystal display panel, in this case the array substrate does not include a capacitor, and the reflective electrode is one of non-transparent electrodes in pixel electrodes or common electrodes.

In one embodiment, as shown in FIG. 2, the pixel unit 11 provides a light source for the fingerprint recognition assembly 2, the fingerprint recognition unit 21 is configured to perform a fingerprint recognition according to the light emitted from the pixel unit 11 reflecting to the fingerprint recognition unit 21 via the touch object 4. The display panel may be an organic light-emitting display panel, the pixel unit 11 may be an organic light-emitting structure, the fingerprint recognition unit 21 is configured to perform a fingerprint recognition according to the light emitted from the organic light-emitting structure reflecting to the fingerprint recognition unit 21 via the touch object 4, for example, the light represented by a solid line as shown in FIG. 2. It should be noted that, FIG. 2 merely exemplarily configures relative positions of the organic light-emitting structure and the fingerprint recognition unit 21. The relative positions of the organic light-emitting structure and the fingerprint recognition unit 21 are not limited in the present disclosure, as long as the light emitted from the organic light-emitting structure is guaranteed to be reflected to the fingerprint recognition unit 21 via the touch object 4.

In one embodiment, as shown in FIG. 2, the fingerprint recognition assembly 2 further includes a fingerprint recognition light source 22, and the fingerprint recognition light source 22 is disposed on one side of the first substrate 20 facing away from fingerprint recognition unit 21, and the fingerprint recognition unit 21 is configured to perform a fingerprint recognition based on the light emitted from the fingerprint recognition light source 22 reflecting to the fingerprint recognition unit 21 via the touch object 4, for example, the light represented by a dotted line as shown in FIG. 2. In one embodiment, the light emitted from the fingerprint recognition light source 22 irradiates to the touch object 4 via a gap between adjacent two fingerprint recognition units 21.

It should be noted that positions of the fingerprint recognition light source 22 are not limited in the present disclosure, as long as the light emitted from the organic light-emitting structure is guaranteed to be reflected to the fingerprint recognition unit 21 via the touch object 4. Meanwhile, the light represented by the solid lines and dotted lines shown in FIG. 2 merely exemplarily gives a certain light emitted from the organic light-emitting structure 11 and the fingerprint recognition light source 22, and the light emitted by the organic light emitting unit 11 and the fingerprint recognition light source may be divergent.

Exemplarily, the fingerprint recognition light source 22 may be a collimated light source or an area light source. In contrast with an adoption of the surface light source, the adoption of the collimated light source may decrease the interferences of the light formed by reflection of the collimated light source via a fingerprint of the user between different fingerprint recognition assemblies 2, so that the accuracy of the fingerprint recognition is improved. Since the thickness of the collimated light source is always larger than that of the surface light source, the usage of the collimated light source may increase the thickness of the display panel.

In one embodiment, as shown in FIG. 2, the display panel further includes an encapsulation layer 12, a polarizer 13, and a glass cover plate 14 sequentially disposed on the pixel unit 11. Among them, the encapsulation layer 12 may include an encapsulation glass or a thin-film encapsulation layer. When the encapsulation layer 12 includes the encapsulation glass, the display panel may not be bent; and when the encapsulation layer 12 includes the thin-film encapsulation layer, the display panel may be bent. In one embodiment, the first substrate 20 serving as a base of the fingerprint recognition unit 21 may include a glass substrate or a flexible substrate. Exemplarily, the cover plate glass 14 is attached with the polarizer 13 by using optical cement.

It should be noted that, the attached drawings in the present disclosure only exemplarily show the size of each element and the thickness of each film layer instead of practical size of each element and the thickness of each film layer in the display panel.

Figure 8:
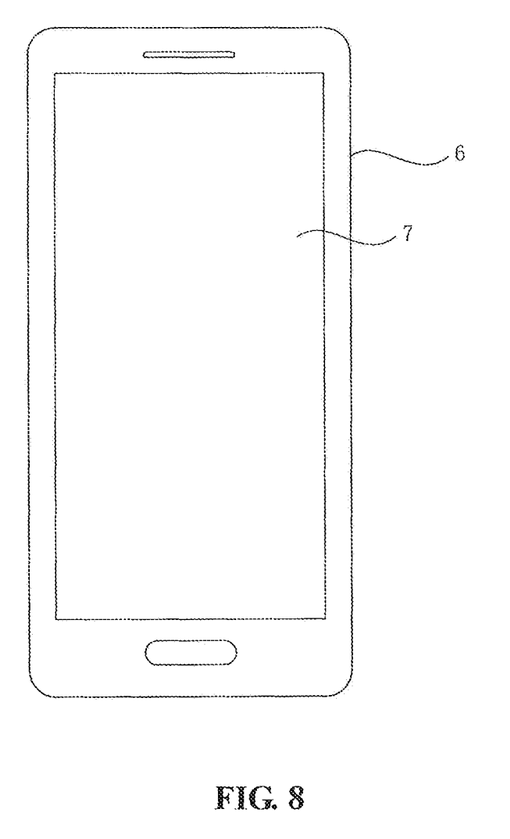
FIG. 8 is a structural diagram showing a display device according to an embodiment of the present disclosure.

The present disclosure further provides a display device, and FIG. 8 is a structural diagram showing a display device according to an embodiment of the present disclosure. As shown in FIG. 8, the display device 6 includes the display panel 7 in the above embodiments. Therefore, the display device 6 provided by the present disclosure also have the beneficial effects of above embodiments, and no repetitions are made here.

It should be noted that the above contents are only preferred embodiments of the present disclosure and its technical principles. It can be understood for those skilled in the art that the present disclosure is not limited to specific embodiments described herein. For those skilled in the art, the present disclosure can be subject to various apparent variations, readjustments and replacements without departing from a protection scope of the present disclosure. Therefore, although the present disclosure is described in detail through above embodiments, the present disclosure is not only limited to the above embodiments. The present disclosure can also include more other equivalent embodiments without deviating from conceptions of the present disclosure. A scope of the present disclosure is determined by a scope of the attached claims.

What is claimed is:

1. A display panel, comprising:
a display assembly, wherein the display assembly comprises an array substrate and a plurality of pixel units disposed on the array substrate; and
a fingerprint recognition assembly, wherein the fingerprint recognition assembly is disposed on one side of the array substrate facing away from the plurality of pixel units, wherein the fingerprint recognition assembly comprises a first substrate and at least one fingerprint recognition unit disposed on the first substrate, wherein the at least one fingerprint recognition unit comprises a photosensitive region, and the at least one fingerprint recognition unit is configured to perform a fingerprint recognition based on light reflected to the photosensitive region via a touch object;
wherein the array substrate comprises a plurality of transparent regions and a plurality of non-transparent regions, along a direction perpendicular to the array substrate, at least a portion of the plurality of transparent regions in the array substrate is covered by the photosensitive region of any one of the at least one fingerprint recognition unit;
wherein in the photosensitive region of the at least one fingerprint recognition unit, a first ratio is a ratio of an area of all portions among the photosensitive region overlapping the transparent regions along a direction perpendicular to the array substrate to an area of the photosensitive region, and a ratio of a maximum value of the first ratio to a minimum value of the first ratio in the display panel is less than 10.

2. The display panel according to claim 1, wherein the plurality of non-transparent regions are arranged in multiple rows along a first extending direction, the plurality of non-transparent regions are arranged in multiple columns along a second extending direction, and wherein the first extending direction and the second extending direction are perpendicular to each other;
wherein along the first extending direction, a largest distance between two points in one of the plurality of non-transparent regions is smaller than that between two points in the photosensitive region of the at least one fingerprint recognition unit.

3. The display panel according to claim 2, wherein the photosensitive region of the at least one fingerprint recognition unit has a rectangular shape, a boundary of the photosensitive region is configured parallel to the first extending direction; or the photosensitive region of the at least one fingerprint recognition unit has a circular shape.

4. The display panel according to claim 1, wherein the plurality of non-transparent regions are arranged in multiple rows along a first extending direction, the plurality of non-transparent regions are arranged in multiple columns along a second extending direction, and wherein the first extending direction and the second extending direction are perpendicular to each other;
wherein along the second extending direction, a largest distance between two points in the one of the plurality of non-transparent regions is smaller than that between two points in the photosensitive region of the at least one fingerprint recognition unit.

5. The display panel according to claim 4, wherein the photosensitive region of the at least one fingerprint recognition unit has a rectangular shape, a boundary of the photosensitive region is configured parallel to the first extending direction; or the photosensitive region of the at least one fingerprint recognition unit has a circular shape.

6. The display panel according to claim 1, wherein the plurality of non-transparent regions are arranged in multiple rows along a first extending direction, the plurality of non-transparent regions are arranged in multiple columns along a second extending direction, and wherein the first extending direction and the second extending direction are perpendicular to each other;
wherein along the first extending direction, a largest distance between two points in one of the plurality of non-transparent regions is smaller than that between two points in the photosensitive region of the at least one fingerprint recognition unit; and
wherein along the second extending direction, a largest distance between two points in the one of the plurality of non-transparent regions is smaller than that between two points in the photosensitive region of the at least one fingerprint recognition unit.

7. The display panel according to claim 6, wherein the photosensitive region of the at least one fingerprint recognition unit has a rectangular shape, a boundary of the photosensitive region is configured parallel to the first extending direction; or the photosensitive region of the at least one fingerprint recognition unit has a circular shape.

8. The display panel according to claim 1, wherein the photosensitive region of the at least one fingerprint recognition unit has a rectangular shape, and a length of a long side of the photosensitive region is not larger than 100 um.

9. The display panel according to claim 1, wherein the photosensitive region of the at least one fingerprint recognition unit has a circular shape, and a diameter of the photosensitive region is not larger than 100 um.

10. The display panel according to claim 1, each of the at least one fingerprint recognition unit comprises a photodiode, an area in which the photodiode is located is the photosensitive region of the at least one fingerprint recognition unit.

11. The display panel according to claim 1, wherein the array substrate comprises a plurality of capacitors, a power signal line, a data signal line, a scanning signal line, a reset signal line and a light-emitting signal line, wherein each of the plurality of pixel units comprises a reflective electrode, an area in which the plurality of capacitors, the power signal line, the data signal line, the scanning signal line, the reset signal line, the light-emitting signal line and the reflective electrode are located is one of the plurality of non-transparent regions.

12. The display panel according to claim 1, wherein each of the plurality of pixel units provides a light source for the fingerprint recognition assembly, the at least one fingerprint recognition unit is configured to perform a fingerprint recognition based on light emitted from the plurality of pixel units reflecting to the at least one fingerprint recognition unit via the touch object.

13. The display panel according to claim 1, wherein the fingerprint recognition assembly further comprises a fingerprint recognition light source, wherein the fingerprint recognition light source is disposed on one side of the first substrate facing away from the at least one fingerprint recognition unit;
wherein light emitted from the fingerprint recognition light source irradiates the touch object via a gap between adjacent two of fingerprint recognition units, and the at least one fingerprint recognition unit is configured to perform a fingerprint recognition based on the light emitted from the fingerprint recognition light source reflecting to the at least one fingerprint recognition unit via the touch object.

14. The display panel according to claim 13, wherein the fingerprint recognition light source is a collimated light source or an area light source.

15. The display panel according to claim 1, wherein the display panel further comprises:
an encapsulation layer, a polarizer, a glass cover plate and a touch electrode layer sequentially disposed on the plurality of pixel units;
wherein the encapsulation layer comprises an encapsulation glass or a thin-film encapsulation layer;
wherein the glass cover plate is attached to the polarizer by using optical cement;
wherein the touch electrode layer is disposed between the encapsulation layer and the polarizer, or between the glass cover plate and the polarizer; and
wherein the first substrate is a glass substrate or a flexible substrate.

16. A display device, comprising a display panel, wherein the display panel comprises:
a display assembly, wherein the display assembly comprises an array substrate and a plurality of pixel units disposed on the array substrate; and
a fingerprint recognition assembly, wherein the fingerprint recognition assembly is disposed on one side of the array substrate facing away from the plurality of pixel units, wherein the fingerprint recognition assembly comprises a first substrate and at least one fingerprint recognition unit disposed on the first substrate, wherein the at least one fingerprint recognition unit comprises a photosensitive region, and the at least one fingerprint recognition unit is configured to perform a fingerprint recognition based on light reflected to the photosensitive region via a touch object;
wherein the array substrate comprises a plurality of transparent regions and a plurality of non-transparent regions, along a direction perpendicular to the array substrate, at least a portion of the plurality of transparent regions in the array substrate is covered by the photosensitive region of any one of the at least one fingerprint recognition unit;
wherein in the photosensitive region of the at least one fingerprint recognition unit, a first ratio is a ratio of an area of all portions among the photosensitive region overlapping the transparent regions along a direction perpendicular to the array substrate to an area of the photosensitive region, and a ratio of a maximum value of the first ratio to a minimum value of the first ratio in the display panel is less than 10.

* * * * *